United States Patent [19]

Kubicek et al.

[11] Patent Number: 4,825,919
[45] Date of Patent: May 2, 1989

[54] RAILROAD ADZER DEBRIS REMOVAL MEANS

[75] Inventors: Todd R. Kubicek, Milwaukee; Andrew M. Dieringer, Waterford, both of Wis.

[73] Assignee: Oak Industries Inc., San Diego, Calif.

[21] Appl. No.: 232,143

[22] Filed: Aug. 15, 1988

[51] Int. Cl.⁴ .................... B27G 19/00; B27C 5/00
[52] U.S. Cl. .................... 144/252 R; 144/133 B; 409/295
[58] Field of Search ............ 409/253, 295, 137; 31/273, 424, 429; 144/133 R, 133 A, 133 B, 252 R, 252 A

[56] References Cited

U.S. PATENT DOCUMENTS

| | | | |
|---|---|---|---|
| 2,336,652 | 12/1943 | Talboys | 144/133 B |
| 2,944,465 | 7/1960 | Jones | 144/252 R |
| 3,274,892 | 9/1966 | Carsey | 409/245 |
| 4,583,895 | 4/1986 | Theurer | 409/295 |

FOREIGN PATENT DOCUMENTS 1329716 9/1973 United Kingdom ............ 144/252 B

Primary Examiner—W. Donald Bray
Attorney, Agent, or Firm—Kinzer, Plyer, Dorn, McEachran & Jambor

[57] ABSTRACT

A railroad tie adzer has a cutter head and means for rotating the cutter head to surface the tie plate area of a tie. A cutter guard extends peripherally about the path of rotation of the cutter head, and there is a vacuum duct opening into the cutter guard to remove debris during the adzing operation. A volute deflector is positioned within the cutter guard and extends partially about and outside of the path of movement of the cutter head. The volute deflector extends from adjacent the vacuum duct circumferentially in the direction of cutter head movement. There is an inclined ramp adjacent the entrance to the vacuum duct to direct debris from adzing, moving in a volute or spiral pattern, as defined by the deflector, into the vacuum duct. The vacuum duct is connected to a fan which in turn is connected to a separator from which the separated dust and debris are discharged away from the adzer.

7 Claims, 2 Drawing Sheets

RAILROAD ADZER DEBRIS REMOVAL MEANS

SUMMARY OF THE INVENTION

The present invention relates to a railroad tie adzer and in particular to a simply constructed, efficient structure for removing the debris from adjacent the adzer cutting head during an adzing operation.

The principal purpose of the invention is a railroad tie adzer utilizing a cutter guard with a volute deflector therein and a vacuum system to draw debris from the cutter guard.

Another purpose is a ride-on railroad tie adzer including vacuum means for removing debris from the area of the cutter head during an adzing operation.

Another purpose is a railroad tie adzer which has a vacuum system to remove debris from the adzer cutter head and a separator to discharge the debris away from the adzing operation.

Other purposes will appear in the ensuing specification, drawing and claims.

BRIEF DESCRIPTION OF THE DRAWINGS

The invention is illustrated diagrammatically in the following drawings wherein.

DESCRIPTION OF THE PREFERRED EMBODIMENT

An adzer of the type disclosed herein is used to resurface the tie plate area on wood ties in a rail gang. The adzer cutting head rotates at approximately 2,350 rpm and as it removes wood from the ties, it creates substantial dust and debris. The debris not only creates less than satisfactory working conditions for the machine operator and surrounding workers, but also leaves debris on the resurfaced area of the tie and in the adjoining rail bed ballast. The present invention is designed for use in a mobile adzer machine and provides a mean for removing the debris from the cutter head area as the adzer is operated.

Figure 1:
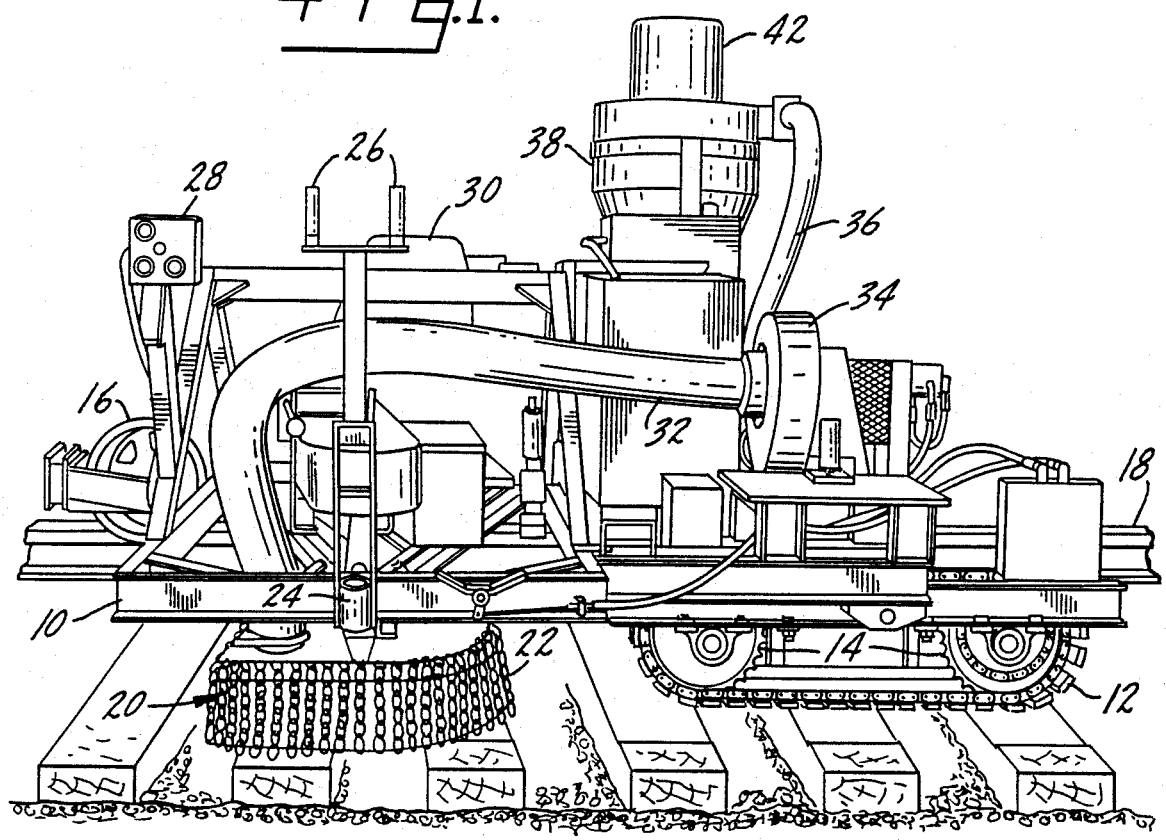
FIG. 1 is a side pictorial view of a railroad tie adzer of the type described.

In FIG. 1, there is pictorially illustrated a mobile railroad adzer machine which has a frame 10, one side of which is supported by a tread 12 mounted on spaced sprocket wheels 14. The opposite side of the adzer may ride on small wheels 16 which support the machine on a rail 18. The cutter head assembly is indicated generally at 20 and has the typical chain guard 22 extending thereabout. The operator who controls both movement of the adzer and operation of the cutter head will be supported on a seat (not shown) which is supported at 24 generally directly above the cutter head assembly. Control handles 26 for properly positioning the cutter head and control panel 28 are positioned for easy access by the machine operator.

The adzer will mount an engine, either diesel or gasoline driven, indicated at 30 which, through a belt drive (not shown), will propel the adzer and drive the cutter head.

Figure 2:
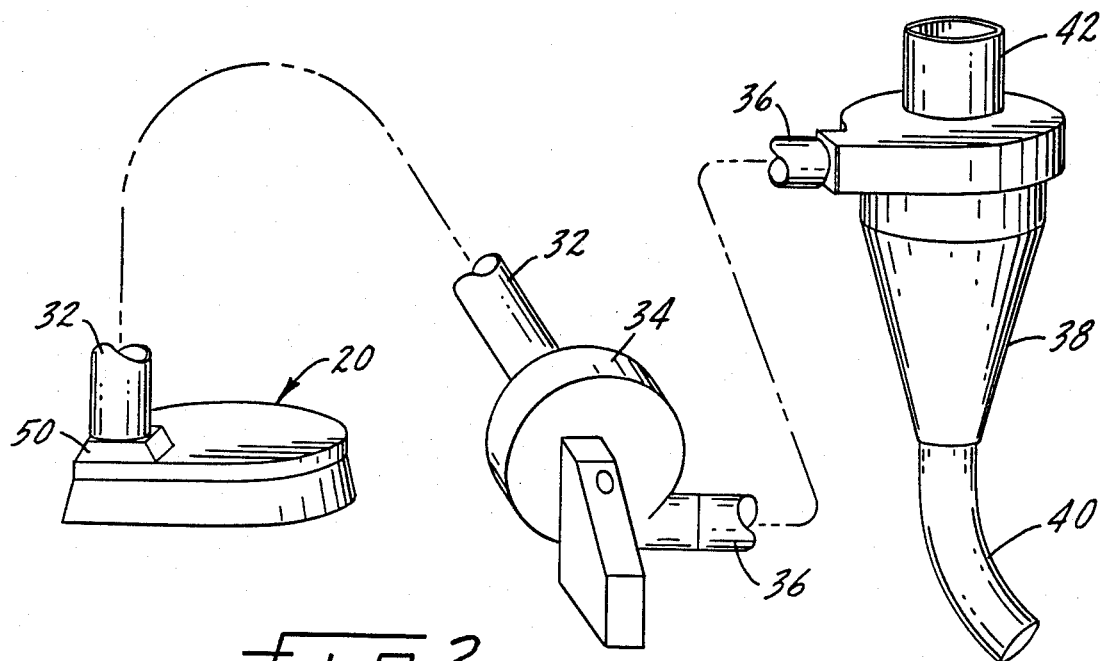
FIG. 2 is a diagrammatic illustration of the components of the debris removal system for use on the adzer of FIG. 1.

The structure for removing debris from adjacent the cutter head is diagrammatically illustrated in FIG. 2 and includes the cutter head assembly 20 connected by a hose 32 to a fan 34. The fan, which will be driven by engine 30, may typically operate at 4,400 rpm and provides a vacuum of approximate 1,600 cfm. The fan is connected by a further hose 36 to a debris collector and separator 38 which has a debris discharge 40, which is positioned to discharge the debris away from the track, and a dust stack 42 which allows the dust to escape to atmosphere from the separator.

Figure 3:
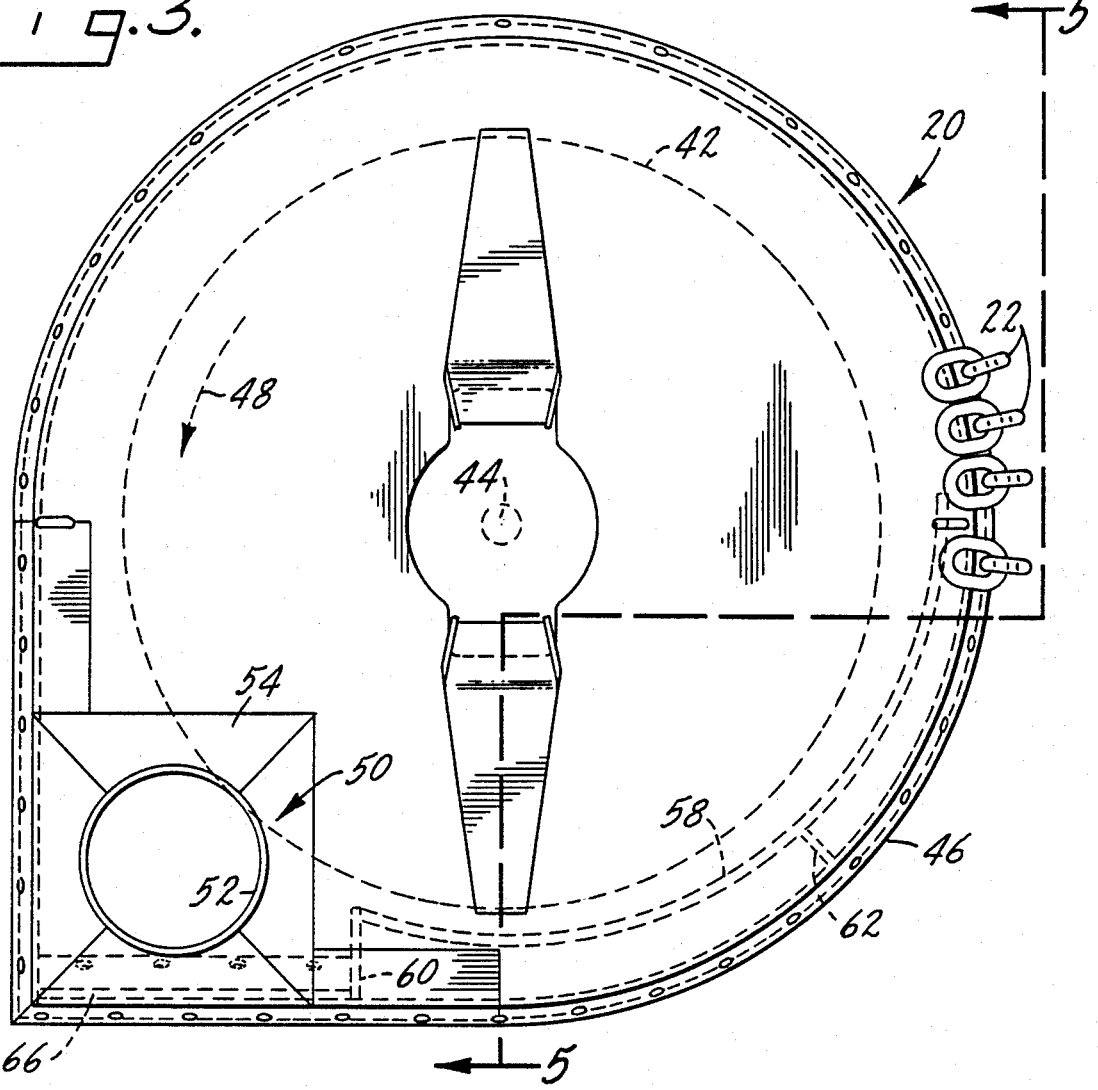
FIG. 3 is an enlarged, top plan view of the adzer cutter guard.
Figure 4:
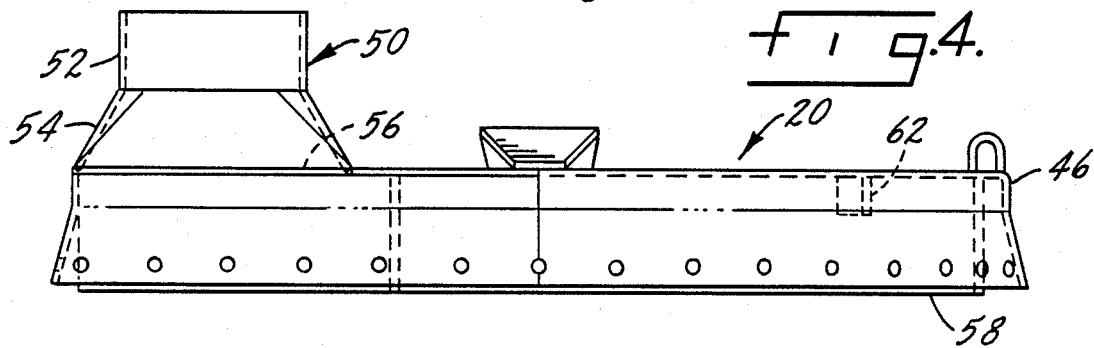
FIG. 4 is a side view of the adzer cutter guard of FIG. 3.
Figure 5:
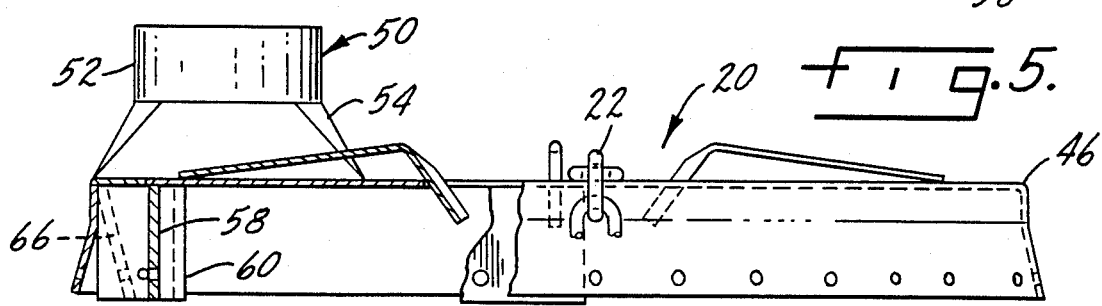
FIG. 5 is a section along plane 5—5 of FIG. 3.

FIGS. 3, 4 and 5 illustrate the details of the cutter head assembly. The cutter head assembly will include a cutter head 42 which is driven by the engine as described, with the cutter head outline being shown in dotted lines in FIG. 3. The cutter head drive shaft is indicated in broken lines at 44. There is a cutter guard housing, indicated at 46, which extends circumferentially or peripherally about the path of movement of the cutter head, which path of movement is represented by the dashed arrow 48. The cutter guard may be formed of sheet metal and may have the conventional chain links 22 extending about the periphery of the guard and thus providing protection for the operator. Guard 46 has a vacuum duct 50 which is connected to hose 32 and which includes a cylindrical duct portion 52 and a somewhat trapezoidal or conical transition portion 54 which sits on cutter guard housing 46 in alignment with an opening 56 in the top of the housing.

Positioned within cutter guard 46 is a deflector 58 which extends from a wall 60 extending inwardly from the interior of cutter guard 46. The deflector is in the shape of a volute or spiral and as such gradually radially extends away from the path of movement 48 of the cutter guard. The volute deflector is supported by wall 60 and by intermediate wall 62. Volute deflector 58 extends generally the full height of the cutter guard housing. Preferably, the deflector extends for an arcuate distance greater than 90° and an arcuate distance of approximately 110° has been found to be quite satisfactory in creating a path of movement for air within the cutter guard housing such as to spiral or swirl the debris from the cutter head operation about the exterior of the cutter guard and finally to vacuum duct 50.

To assist the transition of the debris from movement within the cutter guard into the vacuum duct housing, there is a ramp 66, which may conveniently be formed of a rubber or rubberlike or flexible material, which has the slant or angle indicated in FIG. 5. Ramp 66 is effective to provide an upward direction to the debris which is moving in the path of cutter head rotation, which will be counterclockwise, as illustrated in FIG. 3. Thus, the dust and debris from the cutting operation will have a spiral or a swirling pattern, as defined by deflector 58, and the swirling debris will strike ramp 66 and be directed upwardly into vacuum duct 50, and thence through conduit 32 to the fan 34, and finally to the separator where the debris and dust are separated and discharged in different directions.

The apparatus shown is mounted on a ride-on type of adzer, but it could be used on other types of railroad adzers. What is significant is the manner in which the dust and debris is moved from the location of the cutter head and taken to a location where it may be discharged away from the operator and away from the area in which the adzer is working.

Whereas the preferred form of the invention has been shown and described herein, it should be realized that there may be any modifications, substitutions and alterations thereto.

We claim:

1. A railroad tie adzer including a cutter head and means for rotating it to surface the tie plate area of a tie, a cutter guard extending peripherally about the path of rotation of said cutter head, a vacuum duct opening into said cutter guard, a volute deflector positioned within said cutter guard and extending partially about and outside of the path of movement of said cutter head, said volute deflector extending from adjacent said vacuum duct circumferentially in the direction of cutter head rotation within said cutter guard, and an inclined ramp adjacent the entrance to said vacuum duct to direct debris from adzing, moving in a volute pattern as defined by said deflector, into said duct.

2. The adzer of claim 1 further characterized by and including a wall extending between the inside of said cutter guard and the beginning portion of said volute deflector, said wall being positioned adjacent said vacuum duct.

3. The adzer of claim 1 further characterized in that said inclined ramp is formed of a flexible material and is directly adjacent the entrance to said vacuum duct.

4. The adzer of claim 1 further characterized in that said volute deflector extends circumferentially from adjacent said vacuum duct over an arcuate distance at least 90° and gradually extends radially away from said cutter head.

5. The adzer of claim 1 further characterized in that said vacuum duct is located at the periphery of said cutter guard.

6. The adzer of claim 1 further characterized by and including a fan connected to said vacuum duct.

7. The adzer of claim 6 further characterized by and including a separator connected to said fan, said separator having a opening for dust and an opening for debris.

* * * * *